United States Patent [19]

Impastato, II

[11] Patent Number: 5,651,485

[45] Date of Patent: Jul. 29, 1997

[54] AUDIO EQUIPMENT CARRIER ASSEMBLY FOR A SUPPORT MEMBER OF A VEHICLE SUCH AS A BICYCLE OR AN AEROBIC EXERCISE MACHINE

[76] Inventor: Joseph N. Impastato, II, 2649 Golf View Dr., Apt. 202, Troy, Mich. 48084

[21] Appl. No.: 672,906

[22] Filed: Jun. 28, 1996

[51] Int. Cl.$^6$ .................................................. B62J 11/00
[52] U.S. Cl. .......................... 224/460; 224/448; 224/425; 224/929; 224/246; 248/214
[58] Field of Search .......................... 224/246, 251, 224/412, 420, 425, 428, 433, 440, 447, 448, 451, 452, 454, 455, 459, 460, 567, 568, 929, 930; D12/407; 248/205.2, 214

[56] References Cited

U.S. PATENT DOCUMENTS

| D. 352,267 | 11/1994 | Blackburn | D12/407 |
|---|---|---|---|
| D. 363,266 | 10/1995 | Ropp et al. | D12/407 |
| 584,943 | 6/1897 | Lamson . | |
| 601,701 | 4/1898 | Brown | 224/425 |
| 610,288 | 9/1898 | Streeper . | |
| 1,280,030 | 9/1918 | Hill | 224/448 |
| 2,474,513 | 6/1949 | Behrens | 224/568 |
| 3,193,232 | 7/1965 | Hatcher | 224/433 |
| 3,403,878 | 10/1968 | Opay | 224/420 |
| 3,598,295 | 8/1971 | Seegers | 224/420 |
| 3,921,868 | 11/1975 | Reichbach . | |
| 4,754,901 | 7/1988 | Villanueva et al. . | |
| 4,779,777 | 10/1988 | Johnson et al. | 224/930 |
| 4,896,805 | 1/1990 | Klaczak et al. . | |
| 4,981,243 | 1/1991 | Rogowski . | |
| 5,005,661 | 4/1991 | Taylor et al. | 224/448 |
| 5,040,710 | 8/1991 | Lee | 224/425 |
| 5,114,060 | 5/1992 | Boyer | 224/420 |
| 5,341,971 | 8/1994 | Newbold et al. . | |

FOREIGN PATENT DOCUMENTS

| 517970 | 3/1953 | Belgium | 224/39 |
|---|---|---|---|
| 72928 | 8/1951 | Denmark . | |
| 1181083 | 2/1960 | Germany . | |
| 406191453 | 7/1994 | Japan | 224/30 R |
| 23194 | of 1898 | United Kingdom | 224/30 A |

Primary Examiner—Henry J. Recla
Assistant Examiner—Gregory M. Vidovich
Attorney, Agent, or Firm—Dykema Gossett PLLC

[57] ABSTRACT

The audio equipment carrier assembly is for attachment to a support member of a vehicle such as a bicycle or an aerobic exercise machine. The assembly includes a carrier assembly body in the form of a generally elongated flat plate adapted to carry a personal radio or other portable audio equipment. The plate has a centrally located depression of uniform depth in which is located a resilient shock absorbing pad having a height greater than the depth of the depression. The shock absorbing pad provides a cushion for the portable audio equipment which is placed thereon when the assembly is mounted on a bicycle. A strap of generally Y-shaped configuration includes an elongated stem. One end of the strap is connected in two places to one edge of the plate while the other end of the strap extends across the top of the portable audio equipment to frictionally hold same on the support plate. The free end of the strap extends through a slot in order to guide the strap along the other edge of the plate. Thereafter the strap is reversed in direction and has the free end of the strap secured to an intermediate portion thereof by means of suitable fastening devices. The main plate is provided with a pair of clamping elements which are attached to the bottom surface of the body for mounting the audio equipment carrier on a support member of a vehicle.

19 Claims, 2 Drawing Sheets

AUDIO EQUIPMENT CARRIER ASSEMBLY FOR A SUPPORT MEMBER OF A VEHICLE SUCH AS A BICYCLE OR AN AEROBIC EXERCISE MACHINE

BACKGROUND OF THE INVENTION

1. Technical Field

This invention relates generally to an audio equipment carrier assembly for releasably mounting portable audio equipment on a support member of a vehicle, such as a bicycle or an aerobic exercise machine. More particularly, this invention relates to a removable audio equipment carrier assembly for containing portable audio equipment such as a personal radio, portable cassette stereo player, compact disc player and the like.

2. Description of the Prior Art

Equipment carriers are attached to the handlebars of bicycles and have been used for storage of different supplies and for carrying large articles which could not be carried in the pockets of the bicycle operator. With the popularity of the Sony Corporation's Walkman-type radios, bicycle and aerobic exercise machine manufacturers and operators have wanted to provide an accessory for the operator to listen to music from such radios, compact disc players, etc.

However, there has been no place on a bicycle for carrying the bulk of the stereo equipment. The bicycle operator has attached the radio to his or her body. Such person wears the headphone set to receive the audio signals from the stereo. Problems have been experienced with this method, however, because the radio itself is too bulky to be easily mounted or attached to the body of the operator. Thus, persons have strapped the radio or other audio equipment to the front of the bicycle. These conventional devices have experienced some difficulties or problems when turning corners, hitting bumps in the road or sometimes from improperly being attached to the vehicle. Carrying devices produced by such prior methods are sometimes unstable due to the manner in which they are attached to the bicycle.

Conventional carrying devices are limited in that they are not useful for holding Walkman-style audio equipment on the bicycle during operation. One recent attempt has been made to provide a carrier assembly for audio equipment, with the assembly mounted on the handlebars of the vehicle and adapted to carry a Walkman-style personal radio.

U.S. Pat. No. 4,981,243 issued Jan. 1, 1991 to Rogowski discloses an audio equipment carrier assembly body adapted to receive and contain a Walkman-style personal radio, with the carrier assembly adapted to be mounted on the handlebars of a bicycle.

U.S. Pat. No. 4,754,901 issued Jul. 5, 1988 to Villanuena, et al discloses an audio equipment carrier with a pair of built-in speakers for personal portable radios, tape players and the like, with the carrier adapt to be clamped or mounted on the handlebar of a vehicle such as a bicycle.

The prior patents discussed previously, as well as other patents cited and discussed therein, mount the carriers directly onto the handlebar of the vehicle, such as a bicycle. In addition, each prior art device is designed for generally one type of equipment. As an example, the carrier disclosed in U.S. Pat. No. 4,754,901 includes audio equipment having a pair of speakers which is mounted on the handlebar, with the speakers at opposite sides of the control stem to which the handlebar is affixed. Also, U.S. Pat. No. 4,981,243 has a generally rectangular case with an opening designed to receive a generally rectangular Walkman style radio. Thus, the carriers themselves dictate the type of audio equipment to be carried thereby.

The present invention is directed to an audio equipment carrier assembly which may support any number of differently configured portable stereo equipment such as radio, television, cassette player, portable dictating equipment and the like. In addition, the present invention locates the audio equipment carrier assembly by clamping it to the front beam (upper horizontal bar) of the bicycle or to the beam under the rider's seat (vertical seat post). The audio equipment may be used by a bicycle rider for enjoyment purposes with the assistance of earphones as is well known.

Thus, it is an object of the present invention to provide an audio equipment carrier assembly designed to hold and secure a wide variety of portable cassette stereo players to a bicycle and/or to an aerobic exercise machine by clamping the carrier assembly to the front beam (upper horizontal bar) or the beam under the rider's seat (vertical seat post) of the vehicle or bicycle. If so mounted, it provides to the rider of the bicycle maximum flexibility to operate the portable cassette stereo. The audio equipment carrier assembly is provided with good shock absorbing features in order to minimize music distortion and to insure smooth functioning of the portable cassette stereo equipment.

SUMMARY OF THE INVENTION

It is a feature of the present invention to provide an audio equipment carrier assembly for holding and securing a wide variety of portable cassette stereo players or other portable audio equipment to a bicycle and/or to an aerobic exercise machine by clamping the carrier assembly body to the upper horizontal bar or to the vertical beam under the rider's seat of the bicycle. The advantage of such a feature is that it provides maximum flexibility to the rider of the bicycle to operate the portable cassette stereo or audio equipment.

Another feature of the present invention is to provide an audio equipment carrier assembly of the aforementioned type wherein the carrier assembly body is in the form of a generally elongated flat plate which is adapted to carry the portable audio equipment and has a pair of longitudinally extending edges and top and bottom surfaces, with the plate having a generally centrally located depression of uniform depth in the top surface thereof.

Still another feature of the present invention is to provide an audio equipment carrier assembly of the aforementioned type wherein a pair of longitudinally spaced apart slots are provided adjacent to one longitudinal edge of the plate, with an additional slot being located adjacent to the other longitudinal edge of the plate, said slots being constructed and arranged to mount a strap.

A further feature of the present invention is to provide an audio equipment carrier assembly of the aforementioned type wherein a resilient shock absorbing pad is located in the depression in the top surface of the plate, with the pad having a uniform thickness which is greater than the depth of the depression and providing a cushion for the portable audio equipment placed thereon.

A still further feature of the present invention is to provide an audio equipment carrier assembly of the aforementioned type wherein a flexible or elastic, neoprene or foam strap of generally Y-shape configuration is provided, with the strap having an elongated stem and a pair of spaced apart tabs having ends, with the tabs being connected to one end of the stem. With such a construction, the ends of the tabs extend through the pair of slots and are thereafter attached or secured to other portions of the tabs to thereby connect the strap to the plate.

Another feature of the present invention is to provide an audio equipment carrier assembly of the aforementioned type where the stem has a length sufficient to extend across and to engage the top of the portable audio equipment and to hold it against the shock absorbing pad and plate by extending the free end of the stem along a side of the portable audio equipment and through the additional slot and to thereafter reverse direction so that the free end of the stem is anchored to an intermediate portion of the stem which holds the audio equipment against the pad and plate.

Still another feature of the present invention is to provide an audio equipment carrier assembly of the aforementioned type where a pair of clamping elements are attached to the bottom surface of the body for mounting the assembly on a support member of the vehicle.

A further feature of the present invention is that the carrier assembly for the portable audio equipment provides good shock absorbing qualities in order to minimize music distortion and to insure smooth functioning of the equipment.

A still further feature of the present invention is that the audio equipment carrier assembly is made of relatively few parts which are easy to assemble and in use provides an appealing look and appearance. With such a construction, the audio equipment carrier assembly, once mounted on the vehicle, permits the portable audio equipment to be easily mounted to and removed from the carrier to prevent theft of the equipment. Such audio equipment is held in place on the carrier by means of the flexible or elastic strap which is adjustable to accommodate any appropriate size and shape of portable audio equipment.

Another feature is that the portable audio equipment rests upon the shock absorbing pad and thereafter the strap, tied to the body, is looped over and against the audio equipment to hold the equipment against the shock absorbing pad. With such a construction, the pad provides a cushion for the portable equipment so that some of the vibration and stress generated and transferred to the assembly from the road is absorbed.

Still another feature of the invention is that light weight materials are used to manufacture the device. The carrier assembly body or plate is molded from plastic material such as acrylinitri butidine styrene (A.B.S.) or polyethylene. The slots and depression are molded into the plate during manufacture. The carrier body has a generally kidney shaped configuration including rounded ends and generally longitudinally extending edges, with the depression or crevice provided therein being of generally the same shape as the outer shape of the plate.

A further feature of the present invention is to provide a stop at one end of the plate for preventing the portable cassette stereo or other equipment from slipping out of the grip of the strap with overlies the equipment and holds it in place. The stop is molded with the main body or plate.

A still further feature of the invention is that the shock absorbing pad is made from a foam rubber or urethane. It has an outer configuration following the inner configuration of the depression or crevice. It has a thickness greater than the depth of the depression so that the foam rubber pad projects outwardly from the depression. The pad is attached to the bottom of the depression and provides a compressible cushion for the portable audio equipment.

Another feature of the invention is that the strap is of Y-shape configuration and is designed to provide the maximum flexibility in the operation of the portable audio equipment after it has been strapped to the body. The strap is designed to hold a variety of shapes and sizes of portable cassette stereo equipment. For example, the location of the play or review buttons on some portable cassette stereos is in the middle for many portable cassette stereos. In other equipment the buttons are located at the corners of the equipment. The strap is designed and constructed to accommodate different portable equipment with a wide variety of button locations. Thus, the space between the pair of tabs of the strap provides an opening or window to readily access the buttons in order to operate the portable audio equipment. In addition, the strap has a width less than the width of the equipment and thus does not entirely cover the equipment thereby permitting an operator to access the buttons regardless of where located. The free end of the strap has Velcro™ on its inner side. This end is placed into the single slot side of the main body or plate after the portable cassette stereo is placed on the cushion or pad. The strap is pulled through the slot and reverses direction so that the Velcro™ provided thereon will stick to the top of the strap to hold the portable cassette stereo in place.

Still another feature of the invention is that the audio equipment carrier assembly further includes a pair of clamps. Each clamp may be provided in either a one piece design or a two piece construction. When a one piece construction is utilized, the entire clamp is molded with the carrier assembly body or plate. When a two piece design is utilized, only the upper parts of the clamps are formed with the main body or plate. The bottom or lower parts of the clamps are separate pieces made from the same material as the main body, such as A.B.S. or polypropylene. The clamps are fastened to the bicycle using conventional nut and bolt fasteners. The inside of the clamps are lined with shock absorbing padding made from a material such as foam rubber or a hard rubber which fits in the space between the clamps and the support bar.

Thus it is the final feature of the present invention to provide an audio equipment carrier assembly which is simple in construction, easy to manufacture, has an attractive design, is safe in operation and provides for enjoyment of the audio equipment when properly used by the bicycle rider.

IN THE DRAWINGS

DETAILED DESCRIPTION OF THE PREFERRED EMBODIMENT

Figure 1:
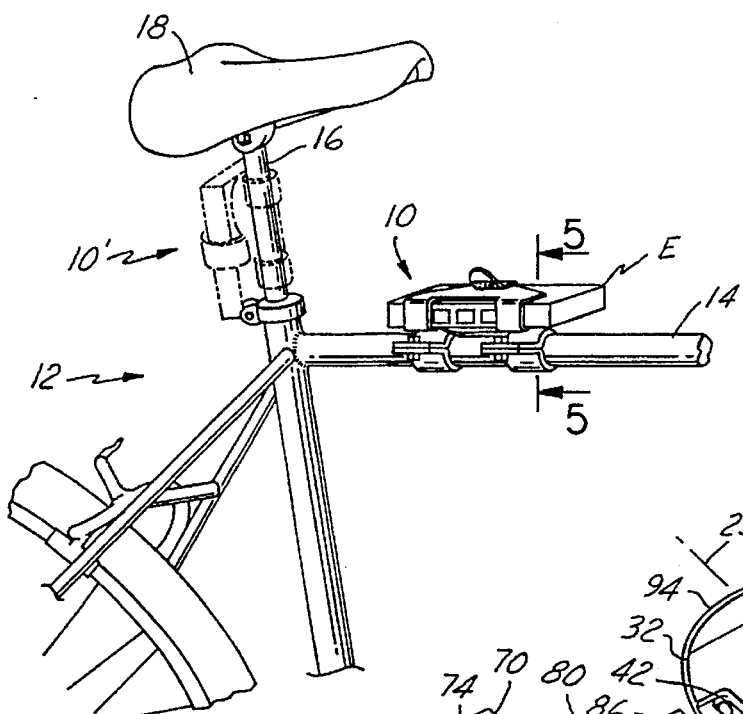
FIG. 1 is a fragmentary perspective view showing the audio equipment carrier assembly located in two positions; in the first position the assembly is mounted on the horizontal bar of the bicycle; and in the second position the assembly is shown in dotted lines on the vertical seat bar beneath the seat.

Referring now to the drawings, the audio equipment carrier assembly forming the present invention is designated by the numeral 10 or 10' in FIG. 1.

The bicycle 12 fragmentally shown in FIG. 1 has a horizontal support bar 14 and a vertical seat bar 16 located below the bicycle seat 18. The carrier assembly 10 is clamped to the front beam or upper horizontal bar 14. As an optional feature, the audio equipment carrier assembly may be attached to the vertical seat bar or beam 16 located beneath the seat 18 as designated by the numeral 10' which shows the assembly in dotted lines.

It should be understood that the present invention may be used with other types of vehicles besides bicycles such as aerobatic exercise machines, tricycles or other type vehicles having a cross bar where the audio equipment carrier assembly could be readily mounted in close proximity to the rider of the vehicle.

The audio equipment carrier assembly 10 comprises four main components including the carrier assembly body or main body or plate 20, a shock absorbing pad or cushion 22 carried by the main body 20, a foam material or a neoprene strap 24 with elastic or flexible qualities and a pair of clamp fasteners 26. In addition, conventional nut and bolt fasteners are used to secure the clamps 27 to the horizontal bar 14 of the bicycle 12.

Figure 2:
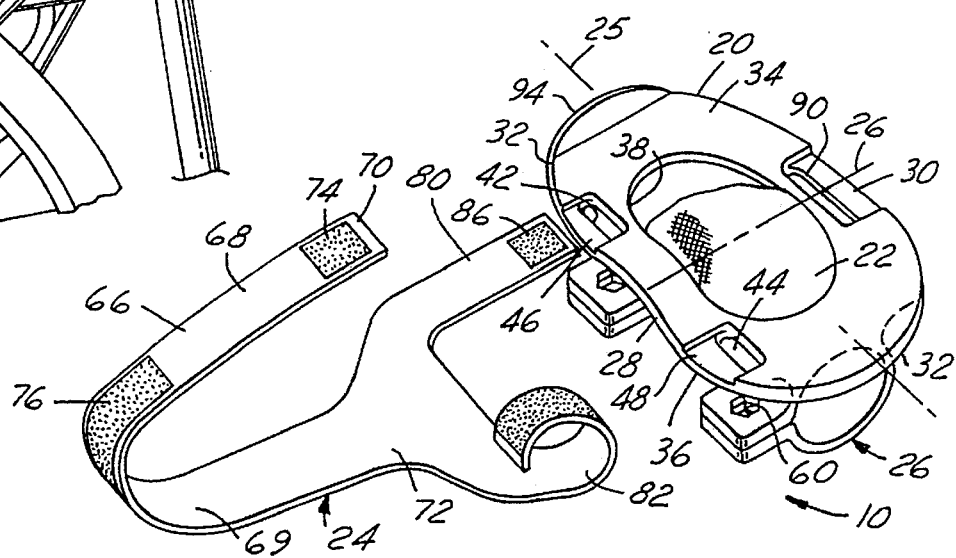
FIG. 2 is a perspective view of the audio equipment carrier in an unassembled position illustrating the carrier assembly body, with integral clamps and a strap.
Figure 5:
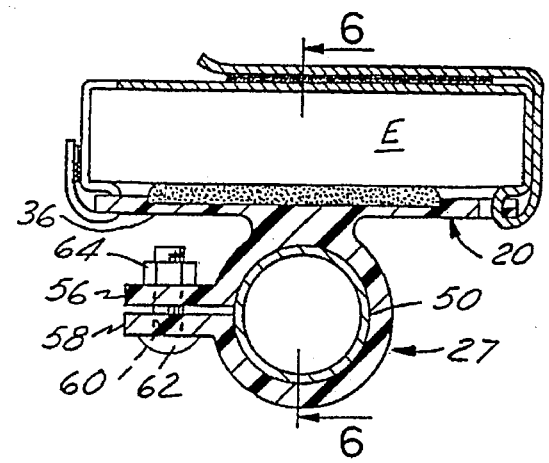
FIG. 5 is a sectional view taken on the line 5—5 of FIG. 1.
Figure 6:
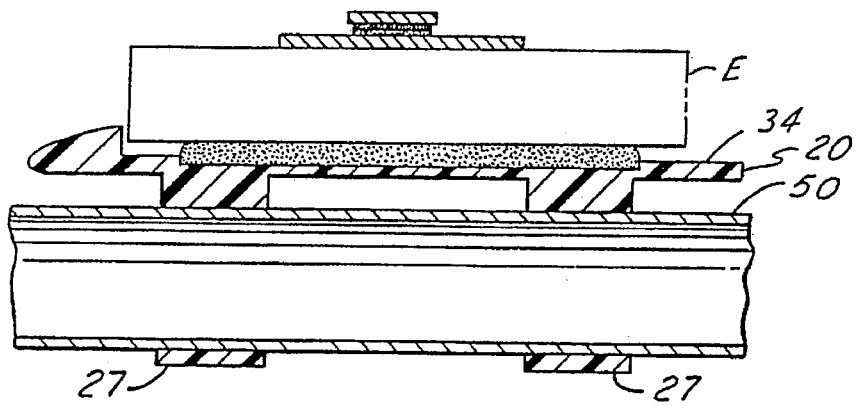
FIG. 6 is a sectional view taken on the line 6—6 of FIG. 5.

The carrier assembly body 20 is in the form of a generally elongated flat plate molded from a plastic material such as A.B.S. or polypropylene. The flat plate 20 is of generally kidney shape configuration having an elongated axis 25 and a transverse axis 26. The flat plate or body 20 has a pair of longitudinal edges 28 and 30 and a pair of rounded ends 32 and 34. The rounded ends 32, 34 and the longitudinal edges 28, 30 form the outer configuration of the plate 20. The plate 20 further includes an upper surface 34 and a lower surface 36. The upper surface 34 has a generally centrally located depression or crevice 38 provided therein of uniform depth as best shown in FIG. 2. Longitudinal edge 28 is provided with a pair of slots 42 and 44 which extend from the top surface 34 through the bottom surface 36. In addition, the top surface 34 is recessed at 46 and 48 to accommodate the strap as will be subsequently described. The carrier assembly body 20 has the clamps 27 formed therewith. Thus the clamps 27 are an extension of the main body 20 and are formed from the same material as best illustrated in FIG. 5. Each clamp 27 includes on the inside thereof a cylindrical liner 50 made from shock absorbing material such as rubber. The liner 50 may come in different thicknesses and several liners may be used to accommodate the various sizes and shapes of the bar or beam provided on the bicycle. The clamp 27 further includes flanges 56 and 58 provided with suitable openings 60 which receive the threaded bolt 62 and nut 64 as best illustrated in FIG. 5.

The inside diameter of the clamp 27 is manufactured or made larger than the outside diameter of most support members of various size bicycles. The difference between the inside diameter of the clamp and the outside diameter of the support member is taken up by a shock absorbing rubber liner placed between the clamp and the support bar. The rubber liners will have different thicknesses to fit the cylindrical spaces which vary from one size bicycle to another size bicycle.

The strap 24 is of Y-shape configuration and is specifically designed to provide the maximum flexibility in the operation of the portable audio equipment after it has been strapped to the main body 20 overlying the shock absorbing pad or cushion 22. The strap 24 is further designed to hold a variety of shapes and sizes of portable cassette stereo. The term "portable audio equipment" includes within the group personal stereos, personal radios, televisions, portable compact disc players, Walkman-style radios and stereos and personal cassette tape players, all of which are designed to provide stereophonic entertainment for the vehicle rider. Such audio equipment is designated by the letter "E".

Figure 3:
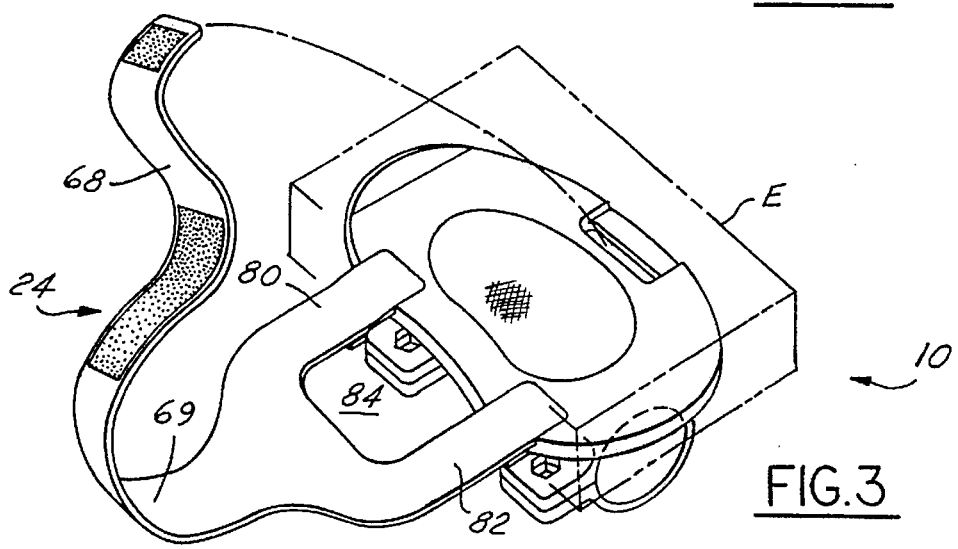
FIG. 3 is a perspective view showing an assembled audio equipment carrier assembly, with the strap in a position ready to be fastened over the equipment, illustrated in phantom lines.

The strap 24 includes an elongated stem 66 having a first surface 68 and a second surface 69. One end 70 of the stem 66 is provided with a Velcro™ fastener 74 on the first surface 68. Inwardly spaced from the Velcro™ fastener 74 is a mating Velcro™ fastener 76. The other end 72 of the strap 66 is provided with a Y-shaped configuration having a pair of tabs 80 and 82. The tabs 80 and 82 are spaced apart to provide a window opening 84 therebetween. The tabs 80 and 82 extend across the bottom of the plate 20 and up through the slots 42 and 44 respectively where the ends of the tabs are reversely turned a relatively short distance so as to overlie the adjacent portion of the tabs. The tab ends may be connected to the remaining portions of the tabs 80 and 82 by stitching or by other fastening methods to thereby assume the configuration illustrated in FIG. 3. The strap 24 provides a number of advantages. Not only will it hold a variety of shapes and sizes of portable cassette stereos on the resilient cushion 22 but also the strap, due to the provision of the window 84, will not hide or cover the buttons of the portable cassette stereo as best illustrated in FIG. 1. Thus, the rider of the vehicle can conveniently push the buttons of the stereo to select different stations or discs.

Figure 4:
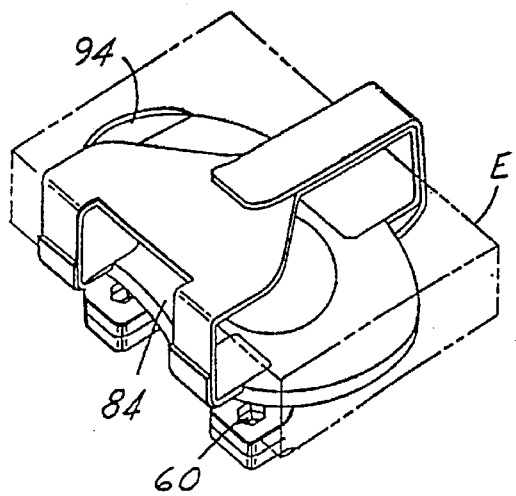
FIG. 4 is a perspective view showing the audio equipment carrier assembly strapped around the portable audio equipment, illustrated in phantom lines.

The strap 24, as indicated in FIGS. 4 and 5, extends across the top of the audio equipment E and thereafter extends through the slot 90 provided on the longitudinal edge 30 of the plate 20. The slot 90 is located on the transverse axis 26. Axis 26 is located midway between the slots 42 and 44. The stem 66 of strap 24 extends across the audio equipment E and through the slot 90. Thereafter the stem 66 is reversed in its direction and extends across the first surface 68 where the Velcro™ fastener 74 on the free end 70 of the stem 66 is secured to Velcro™ fastener 76 provided on an intermediate portion of the stem 66.

The strap 24 can be pulled tight and the Velcro™ fastener 74 will engage the mating fastener 76 of the strap to hold the portable cassette stereo E in place. If the portable cassette stereo E is provided with buttons at one end, such buttons can be positioned in conjunction with the placing of the flexible end of the strap.

The main body or plate 20 is provided with an integral upstanding stop abutment 94 at rounded end 32. The purpose of the stop 94 is to prevent the portable cassette stereo equipment E from slipping out of the grip of the strap 24. In addition, the stop abutment 94 provides a place where the equipment E rests at the time the elastic strap 24 is wrapped around equipment E to frictionally hold same on the plate 20.

The shock absorbing pad 22 has a thickness which is approximately doubled the depth of the depression or crevice 38 provided in the body 20. The pad 22 thus extends above the top surface 34 of the plate 20. Pad 22 is made from foam rubber or urethane. As noted in FIGS. 2 and 3, the pad 22 has an outer configuration following the inner configuration of the depression 38. Thus, the pad, which is attached to the bottom of the depression 38 by a suitable adhesive, provides a compressible cushion for the portable audio equipment E so that some of the vibration and stress generated and transferred to the assembly 10 from the road is absorbed.

The strap 24 provides the means for releasably securing the equipment E on the resilient cushion 22 of the main body 20. The elastic strap 24 is made from neoprene or foam rubber. The means for attaching the strap 24 to the body 20 may include various attachment methods such as stitching, stapling or even using Velcro™ fasteners. Velcro™ is a registered trademark of Velcro U.S.A., Inc. Such fastener is a hook and eye type fastening material which is well known in the art. There is a female portion such as fastener 74 provided on ends 70 of the stem 66 and a male fastener such as fastener 76 provided on an intermediate portion of the stem 66. Both fasteners are located on the same side 68 of the stem. In addition, other conventional means of attachment could be used.

The clamps 26 may be integrally formed with the plate 20 during the manufacture thereof as is best shown in FIG. 5. Thus, the clamps 26 are made from the same material as the main body such as A.B.S. or polypropylene. The clamps 26 may be opened so as to extend around the bar of the bicycle and thereafter converge tightly around the bar so as to receive the threaded connections 62 and 64 mentioned previously.

It is contemplated that the bolt head is hexagonal and it sits on a hexagonal groove placed on the upper part of the clamp. The nut 64 is also hexagonal. The groove in the main body 20 is designed to make the nut 64 practically invisible and at the same time able to fit bicycle beams or bars of various shapes and sizes. The hexagonal head design makes for easy fastening of the device to the bicycle. The nut and bolt combination conforms to standards available in the marketplace.

Figure 7:
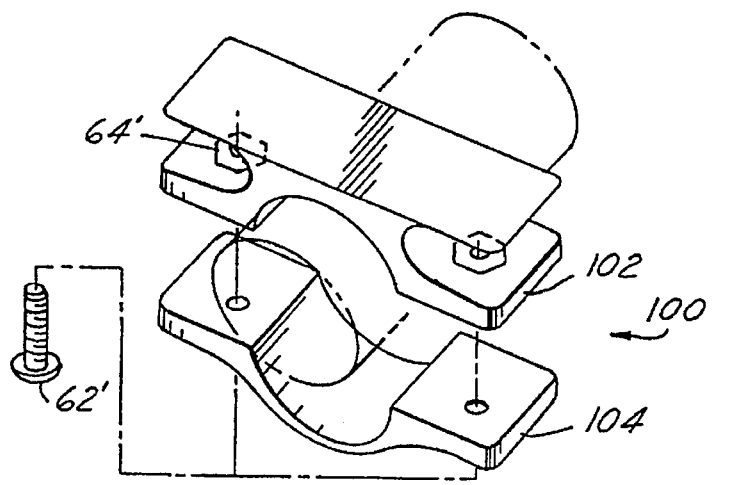
FIG. 7 is a perspective view of a modified clamp, with the support bar illustrated in phantom lines.

It should be appreciated that a two piece clamp may be used rather than the one piece clamp 26. As shown in FIG. 7, a modified clamp 100 includes an upper clamp part 102 which is molded directed with the main body. The lower part 104 is a separate piece. Each part, 102 and 104, has a pair of flanges which mate with the flanges of the other part. After the audio equipment carrier assembly has been mounted on the bar of the bicycle, the mating lower part 104 is applied around the lower part of the bar and the clamp parts are secured together by conventional nut and bolt fasteners 64' and 62', respectively. The clamp part 104 is made from the same material as the part 102 such as A.B.S. or polypropylene.

While my invention has been described in terms of a preferred embodiment, it should be appreciate that other embodiments could be readily adapted by one skilled in the art. Thus, the scope of my invention is limited only by the claims which follow.

What I claim is:

1. An audio equipment carrier assembly for attachment to a support member of a vehicle such as a bicycle or an aerobic exercise machine, comprising:

a carrier assembly body in the form of a generally elongated flat plate adapted to carry a personal radio, portable cassette stereo player or other portable audio equipment, said plate having a pair of longitudinally extending edges and top and bottom surfaces, said plate having a centrally located depression of generally uniform depth in the top surface thereof;

a pair of longitudinally spaced apart slots adjacent one longitudinal edge of said plate, and an additional slot located adjacent the other longitudinal edge of said plate;

a resilient, shock absorbing pad located in said depression in the top surface of said plate, said pad having a uniform thickness which is greater than the depth of said depression and providing a cushion for the audio equipment;

a strap of generally Y-shaped configuration having an elongated stem with a pair of end portions and a pair of spaced-apart tabs each having inner and outer ends, said tabs on said inner ends being connected to one end portion of said stem, the outer end of each said tabs extending through a respective one of said pair of slots and thereafter attached to another portion of said tab to thereby connect said strap to said body;

said stem having a length sufficient to extend across and to engage the portable audio equipment and thereafter to extend through said additional slot, with the other end portion of the stem anchored to an intermediate portion of the stem which holds the portable audio equipment against said plate; and a pair of clamping elements attached to the bottom surface of said body for mounting the audio equipment carrier assembly on a support member of a vehicle.

2. The audio equipment carrier assembly of claim 1 wherein said carrier assembly body is made from a plastic material; said shock absorbing pad is made from a compressible material; and said strap is made from a flexible material.

3. The audio equipment carrier defined in claim 2 wherein said carrier body assembly is made from A.B.S.;

said pad is made from a foam material and said strap is made from neoprene.

4. The audio equipment carrier assembly of claim 1 wherein said elongated flat plate has a pair of ends, said ends being generally curved and a stop element located at one end of said plate, said stop element providing an abutment for the audio equipment to engage and thereby prevent the audio equipment from slipping out from under said strap.

5. The audio equipment carrier assembly defined in claim 1 wherein said shock absorbing pad is made from a foam rubber padding and is effective to provide a cushion for the audio equipment so that some of the vibration and stress is absorbed by the foam rubber padding and thereby permits the audio equipment to have a smooth ride.

6. The audio equipment carrier assembly of claim 1 wherein each clamp has a pair of semi-circular clamp portions which are designed to fit around the tubular support throughout 360°, each clamp portion terminating in a pair of flanges which are provided with aligned openings for receiving a threaded nut and bolt fastener to secure the clamp portions and thereby the audio equipment carrier assembly to the support member of the vehicle.

7. The audio equipment carrier assembly of claim 1 wherein each clamping element is a two piece unit including an upper part which is attached to said bottom surface of said body, and a lower part being a separate piece, each of said two piece unit having a pair of flanges which over lie flanges provided on the other piece of the clamping element; and nut and bolt fasteners extending through openings provided in the flanges for securing the two piece unit together thereby affixing the audio equipment carrier assembly to the support member of a vehicle.

8. The audio equipment carrier assembly of claim 1 wherein each clamping element is lined with shock absorbing padding on the portion thereof which engages the support member thereby providing additional shock absorbing qualities for the audio equipment carrier assembly.

9. The audio equipment carrier assembly of claim 1 wherein said pair of clamping elements being made with and from the same material as said plate.

10. The audio equipment carrier assembly of claim 9 wherein said plate and said clamping elements are made from a plastic material.

11. The audio equipment carrier assembly of claim 10 wherein said plastic material is A.B.S.

12. An audio equipment carrier assembly for attachment to a support member of a vehicle such as a bicycle or an aerobic exercise machine, comprising:

a carrier assembly body in the form of a generally elongated flat plate adapted to carry a personal radio, portable cassette stereo player or other portable audio equipment, said plate having a pair of longitudinally extending edges and top and bottom surfaces, said plate having a centrally located depression of generally uniform depth in the top surface thereof;

a pair of longitudinally spaced apart slots adjacent one longitudinal edge of said plate, and an additional slot located adjacent the other longitudinal edge of said plate;

a resilient, shock absorbing pad located in said depression in the top surface of said plate, said pad having a uniform thickness which is greater than the depth of said depression and providing a cushion for the audio equipment;

a strap of generally Y-shaped configuration having an elongated stem with a pair of end portions and a pair of spaced-apart tabs each having inner and outer ends, said tabs on said inner ends being connected to one end portion of said stem, the outer end of each said tab extending through a respective one of said pair of slots and thereafter attached to other portion of said tab to thereby connect said strap to said body;

said tabs being spaced apart to allow user accessability to at least some of the plurality of control keys or buttons of the portable audio equipment and allows user viewability of the keys or buttons of said portable audio equipment;

said stem having a length sufficient to extend across and to engage the portable audio equipment and thereafter to extend through said additional slot, with the other end portion of the stem anchored to an intermediate portion of the stem which hold the portable audio equipment against said plate; and a pair of clamping elements attached to the bottom surface of said body for mounting the audio equipment carrier assembly on a support member of a vehicle.

13. The audio equipment carrier assembly of claim 12 wherein said elongated flat plate has a pair of ends, said ends being generally curved and a stop element located at one end of said plate, said stop element providing an abutment for the audio equipment to engage and thereby prevent the audio equipment from slipping out from under said strap.

14. The audio equipment carrier assembly defined in claim 13 wherein said shock absorbing pad is made from a foam rubber padding and is effective to provide a cushion for the audio equipment so that some of the vibration and stress is absorbed by the foam rubber padding and thereby permits the audio equipment to have a smooth ride.

15. The audio equipment carrier assembly of claim 13 wherein each clamp has a pair of semi-circular clamp portions which are designed to fit around the tubular support throughout 360°, each clamp portion terminating in a pair of flanges which are provided with aligned openings for receiving a threaded nut and bolt fastener to secure the clamp portions and thereby the audio equipment carrier assembly to the support member of the vehicle.

16. The audio equipment carrier assembly of claim 13 wherein each clamping elements is a two piece unit including an upper part which is attached to said bottom surface of said body, and a lower part being a separate piece, each of said two piece unit having a pair of flanges which over lie flanges provided on the other piece of the clamping element; and nut and bolt fasteners extending through openings provided in the flanges for securing the two piece unit together thereby affixing the audio equipment carrier assembly to the support member of a vehicle.

17. The audio equipment carrier assembly of claim 12 wherein each clamping element is lined with a shock absorbing padding on the portion thereof which engages the support member thereby providing additional shock absorbing qualities for the audio equipment carrier assembly.

18. The audio equipment carrier assembly of claim 12 wherein said pair of clamping elements being made with and from the same material as said plate.

19. The audio equipment carrier assembly of claim 18 wherein said plate and said clamping elements are made from a plastic material; said shock absorbing pad is made from a compressible material; and said strap is made from a flexible material.

\* \* \* \* \*